United States Patent
Bogoni et al.

(10) Patent No.: US 7,417,790 B2
(45) Date of Patent: Aug. 26, 2008

(54) LOOPED OPTICAL NETWORK WITH ASE LIGHT RECIRCULATION AND LINK AND NETWORK SURVIVABILITY CONTROL SYSTEM

(75) Inventors: Antonella Bogoni, Montova (IT); Giovanni Sacchi, Milan (IT); Antonio D'Errico, San Severo (IT); Fabrizio Di Pasquale, Pisa (IT)

(73) Assignee: Marconi Communications SpA (IT)

( * ) Notice: Subject to any disclaimer, the term of this patent is extended or adjusted under 35 U.S.C. 154(b) by 0 days.

(21) Appl. No.: 10/571,506

(22) PCT Filed: Sep. 10, 2004

(86) PCT No.: PCT/EP2004/052127

§ 371 (c)(1),
(2), (4) Date: Nov. 7, 2006

(87) PCT Pub. No.: WO2005/025096

PCT Pub. Date: Mar. 17, 2005

(65) Prior Publication Data

US 2007/0064305 A1    Mar. 22, 2007

(30) Foreign Application Priority Data

Sep. 11, 2003    (IT) .......................... MI2003A1742

(51) Int. Cl.
*H01S 3/00*    (2006.01)
(52) U.S. Cl. .............................. 359/337.11; 359/341.41
(58) Field of Classification Search ................. 359/337, 359/337.11, 337.4, 341.41; 398/3
See application file for complete search history.

(56) References Cited

U.S. PATENT DOCUMENTS

| | | | |
|---|---|---|---|
| 6,025,941 A | * | 2/2000 | Srivastava et al. .............. 398/7 |
| 6,388,802 B1 | * | 5/2002 | Allan .......................... 359/337 |
| 6,421,168 B1 | * | 7/2002 | Allan et al. .................. 359/337 |
| 6,735,391 B2 | * | 5/2004 | Lee et al. ........................ 398/3 |
| 7,019,894 B1 | * | 3/2006 | Stentz et al. ........... 359/341.41 |

FOREIGN PATENT DOCUMENTS

EP    1 030 415    8/2000

OTHER PUBLICATIONS

Saleheen HI: "Closed Cycle Lashing of ASE Noise in a WDM Ring Network." Technical Digest. CLEO/Pacific Rim 2001. 4th Pacific Rim Conference on Lasers and Electro-Optics, vol. 2, No. II, Jul. 15, 2001, pp. 558-559, XP002279117.

Xu L et al. "Suppression of Beating Noise of Narrow-Linewidth Erblum-Doped Fiber Ring Lasers by Use of a Semiconductor Optical Amplifier." Optics Letters, Optical Society of America, Washington, US, vol. 28, No. 10, May 15, 2003, pp. 780-782, XP001166553. ISSN: 0148-9592.

* cited by examiner

*Primary Examiner*—Mark Hellner
(74) *Attorney, Agent, or Firm*—Coats & Bennett, P.L.L.C.

(57) ABSTRACT

A looped WDM optical network comprises an optical loop with optical amplifiers (12,16) between the sections of the loop (11) and with ASE recirculation in the loop. At a point of the loop a laser beam is injected and allowed to circulate in the loop with the laser beam being centered around a $\lambda_{LINK}$ wavelength where it is desired that a lasing peak be generated. This supplies high network strength in terms of section loss variations and greatly improves the OSNR of the WDM signal. High network survivability is also achievable.

20 Claims, 8 Drawing Sheets

LOOPED OPTICAL NETWORK WITH ASE LIGHT RECIRCULATION AND LINK AND NETWORK SURVIVABILITY CONTROL SYSTEM

The present invention relates to a looped optical-transmission network where at least one optical amplifier is needed to compensate for losses in the fibers and in the passive components and in particular in a transmission system operating with Wavelength Division Multiplexing (WDM) techniques.

In co-pending patent application WO 2004/064280 looped WDM networks are considered based on Erbium-Doped Fiber Amplifier" (EDFA) with recirculation of the Amplified Spontaneous Emissions (ASEs) in which each EDFA does not include any gain-control mechanism and gain control is achieved automatically by ASE light recirculation in the loop.

In such networks, the light produced by the "lasing" effect is generated at wavelengths which depend on the balance of the network sections and the EDFA structure. In general, with a given EDFA structure the wavelength which gives peak gain in the EDFA cascade in the looped configuration depends on the losses in the sections. In particular, by reducing this loss, the wavelength which gives peak gain will move from approximately 1532 nm towards the higher wavelengths like around 1560 nm for example.

Loss of the EDFA section and structure must be finely controlled so that peak gain appears at a wavelength $\lambda_{ASE}$ that is well separated from the $\lambda_1$-$\lambda_N$ band of the WDM signal. For example, a suitable WDM looped network configuration based on ASE light recirculation can be implemented with $\lambda_{ASE}$=1532 nm and 16 WDM channels spaced at 100 GHz and located between 1544 nm and 1558 nm.

The WDM looped network configuration based on ASE light recirculation can give acceptable performance at very low cost. Indeed, ASE light recirculation gives an automatic gain control mechanism which avoids complex and costly devices and algorithms usually required for other EDFA-based standard WDM looped networks. In standard configurations, ASE light can however increase in the loop in an uncontrolled manner leading to the arise of serious performance degradation which is strongly dependent on network operating conditions.

Basically, two solutions were proposed in the prior art with the purpose of keeping an undesired ASE increase under control. The first solution is based on a break in ASE circulation at a specific node in the loop. In this manner the problem is solved with the disadvantage of having to introduce additional passive components and/or with system flexibility loss. Centralized traffic is necessary or any traffic reconfiguration requires the visit of the node realizing the ASE break. The second solution tries to keep the gain always below the "lasing" effect threshold so that ASE recirculation cannot increase in power by propagating along the loop. Neither solution is however sufficiently effective and they require complex and costly devices and algorithms. A problem with this approach is that the EDFA or similar amplifiers have gain dependent on the power applied at input and in the network the power input to the amplifiers depends in turn on the number of channels active at that moment. For this reason, to keep total gain below the lasing threshold under all possible conditions including the addition or removal of channels and nodes, a complex algorithm for overall control of the loop with many monitoring points is necessary or it is necessary to hold gain of the individual amplifiers low enough to ensure that, even under conditions leading to maximum amplifier gain, the total gain in the network is less than 1. This solution brings a considerable reduction in the total performance achievable since, when maximum gain conditions are far, amplification of the individual amplifiers is much lower than might be achieved.

In WDM looped networks based on ASE recirculation, the signal power per channel at the EDFA input must be low enough (for example −20 dBm/ch) to keep predominant the lasing effect light at $\lambda_{ASE}$ on each EDFA output. This characteristic ensures that the transient effects due to the WDM channel ADD and DROP operations will be limited. Two main limiting factors were identified in the EDFA-based WDM looped networks with ASE recirculation. The first is that the peak wavelength of the gain and the Optical Signal To Noise Ratio (OSNR) of the signal depend strongly on the network section balance and the EDFA structure (length of active fiber and pump power). This requires in each section the use of optical attenuators and complex installation procedures. Furthermore, to make the network operative under stable conditions, high section losses must be introduced with resulting performance reduction towards the signal-to-noise ratio (OSNR). It can also be noted that while the EDFA gain exactly compensates for the losses of the sections and of the components at the $\lambda_{ASE}$ wavelength of the gain peak, the gain at the wavelengths of the signals will be lower than with $\lambda_{ASE}$. The highest difference in gain ΔGmax at the lasing light and signal wavelengths must be controlled. ΔGmax should be high enough to avoid network instability caused by gain peak wavelength variations induced by WDM add and drop operations and/or loss variations in the sections caused by ageing of components and connectors. At the same time, ΔGmax should be low enough to ensure acceptable performance of the signal-to-noise ration for the WDM signals propagated along the looped network. It is difficult to find an optimal ΔGmax without degrading network OSNR performance and ensure good network stability at the same time.

The second important limiting factor is that with failures of the fiber and/or an EDFA, strong signal power ranges are expectable because of loss of the gain lock mechanism supplied by recirculation. This effect must be kept under control since these power transients can damage the components in the receiving side of the EDFAs and generate other problems caused by nonlinear effects of propagation. It should be noted also that where there is breakage of fibers and/or EDFA, the extreme signal power ranges become ever greater and faster along the EDFA cascade.

To obtain the greatest advantages from the use of WDM looped networks based on ASE recirculation in terms of simplicity and cost reduction, it is very important to find suitable solutions able to improve OSNR performance, ensure sturdiness of the network in terms of section loss variations and network survival in case of fiber or EDFA breakage.

In the co-pending patent application WO 2004/064280 incorporated herein by reference a gain control method in a ring optical transmission system was proposed comprising along the ring rare earth doped fiber amplifiers and comprising positioning a gain peak at a wavelength ($\lambda_{ASE}$) outside the band ($\lambda_1$-$\lambda_n$) of the channels transmitted along the ring and corresponding to an ASE emission peak of the amplifiers in the ring and employing the lasing peak produced thus as a gain stabilization signal.

To supply a gain check of a single EDFA optical amplifier it was proposed in the prior art to use a local oscillator at the amplifier to produce an auxiliary compensation wave added to the useful signal. A similar system is described for example in U.S. Pat. No. 6,043,931. This allows stabilization of the gain of a single amplifier but this is not at all useful for solving the above-mentioned problems of a looped network. The system proposed in U.S. Pat. No. 6,043,931 realizes a gain stabilization which remains local at the individual amplifier since it is realized through a gain link of the fully optical amplifier. Each amplifier of the network should therefore be realized in accordance with that patent. This is excessively costly and in any case an amplifier stabilized in this manner does not satisfy the above-mentioned overall needs of a looped network, especially with ASE recirculation.

The general purpose of the present invention is to remedy the above-mentioned shortcomings by making available a method and a network with an effective, economical and sturdy system for link and network survivability control.

In view of this purpose it was sought to provide in accordance with the present invention a looped WMD optical network comprising an optical loop with optical amplifiers between loop sections and with ASE recirculation in the loop and characterized in that at a point of the loop a laser beam is injected and allowed to circulate in the loop with the laser beam being centered around a $\lambda_{LINK}$ wavelength where it is desired that a lasing peak be generated.

Preferably the $\lambda_{link}$ wavelength is centred outside a band $(\lambda_1-\lambda_n)$ of the channels to be transmitted on the loop.

Again in accordance with the present invention it was also sought to provide a method for control of the link in a WDM looped optical network comprising an optical loop with optical amplifiers between loop sections and ASE recirculation in the loop in accordance with which a laser beam centered around a $\lambda_{LINK}$ wavelength where it is desired to generate a lasing peak is injected at a point in the loop and made to circulate in the network.

To clarify the explanation of the innovative principles of the present invention and its advantages compared with the prior art there is described below with the aid of the annexed drawings a possible embodiment thereof by way of non-limiting example applying said principles. In the drawings.

Figure 1:
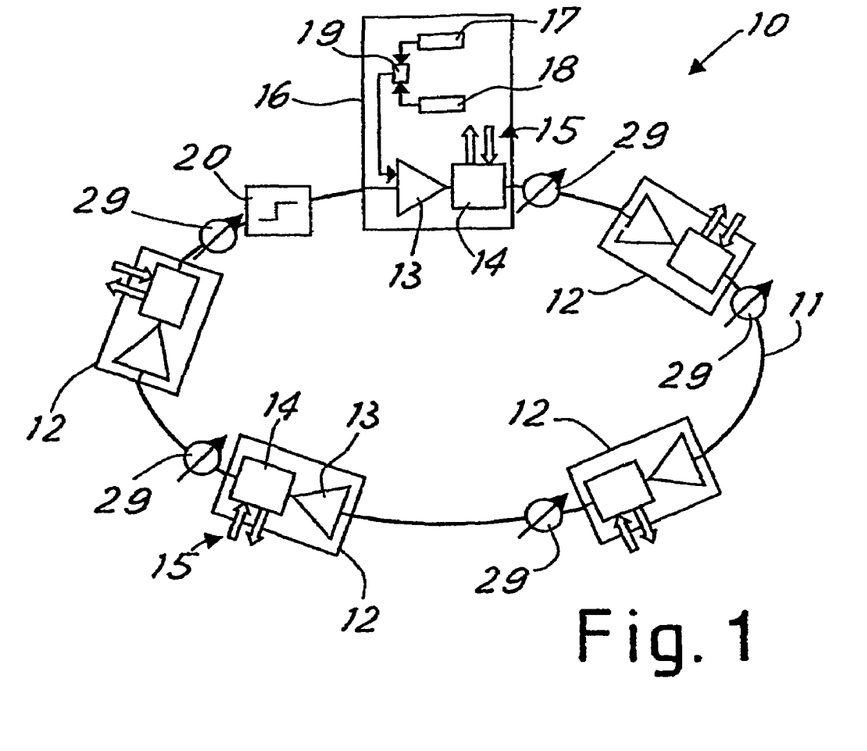
FIG. 1 shows diagrammatically a looped network realized in accordance with the principles of the present invention.

With reference to the figures, FIG. 1 shows diagrammatically a looped optical transmission network where at least one optical amplifier is necessary to compensate for losses in the fibers and in the passive components and in particular in a transmission system operating with Wavelength Division Multiplexing (WDM) techniques.

The looped network designated as a whole by reference number 10 applying the principles of the present invention comprises an optical fiber loop 11 divided in sections between which are nodes 12 comprising known optical amplifiers 13 (for example EDFAs) and known devices 14 for adding and dropping channels to and from the network at input/output units 15. Each EDFA does not include a gain centre mechanism and gain control is achieved automatically by ASE light recirculation in the loop.

In accordance with the present invention one of the looped network amplification nodes (called here "master" and designated as a whole by reference number 16) is equipped with a laser 17, advantageously a Distributed Feed Back (DFB) type centered around 1532 nm ($\lambda_{LINK}$) i.e. in the spectral region where it is desired that a lasing peak be generated. Advantageously, the laser beam powers at the EDFA input are chosen between −5 dBm and +10 dBm.

Under normal operating conditions the beam produced by the laser 17 is injected into the loop (advantageously upstream of the EDFA amplifier of the node) and allowed to circulate therein. This realizes the link control. As clarified below, it was surprisingly found that this supplies good sturdiness of the network in terms of section loss variations and greatly improves the OSNR of the WDM signal.

Since in accordance with the present invention the behavior of the network is strongly dependent on the presence of the additional laser beam which effects link control, to make the network more reliable a redundant laser generation system can be advantageously provided in the master node 16. In particular, the system can also provide an additional DFB laser 18 which is lit if the first DFB 17 fails.

In addition, known Variable Attenuators (VOA) 29 can be provided at the output of each EDFA to be able to standardize the loss of each section (for example at 4×19 dB as will be indicated below with reference to FIGS. 2 and 3). With these attenuators it is easier, even with "link control", to control the gain peaking and force it to the wavelength desired, for example 1532 nm. With losses of low sections corresponding for example to only 25 km of fiber and fixed add/drop for few channels, the gain peaking would form probably around 1560 nm. When the "link control" is used the lasing peak is a single wavelength corresponding to the link control wavelength. The lasing light provided by ASE light recirculation controls each EDFA, and using the "link control" forces the lasing light to be at a given wavelength.

To learn and show the advantages of a network having the link control mechanism in accordance with the present invention, various experiments were carried out on a test network. For the sake of simplicity, only four sections of 25 km of fiber each were used but the same conclusions can be extended to a much higher number of sections.

The dynamic behavior of a test signal was observed after propagation along the entire looped network and under various addition (ADD) and subtraction (DROP) operations of WDM channels with and without the link control at 1532 nm of the present invention.

Under test conditions, three high-power WDM channels were activated and deactivated through an Acoustic Optical Modulator (AOM) to simulate 15 or 16 WDM channels added to or subtracted from the master node where the link control is inserted in the network.

The structure of the EDFA amplifier was kept simple to meet low cost requirements. Approximately 10 m of fiber doped with erbium ions with absorption peak at 1532 nm of approximately 7 dB/m are pumped both ways at 980 nm (total pump power: 100 mW).

Figure 2:
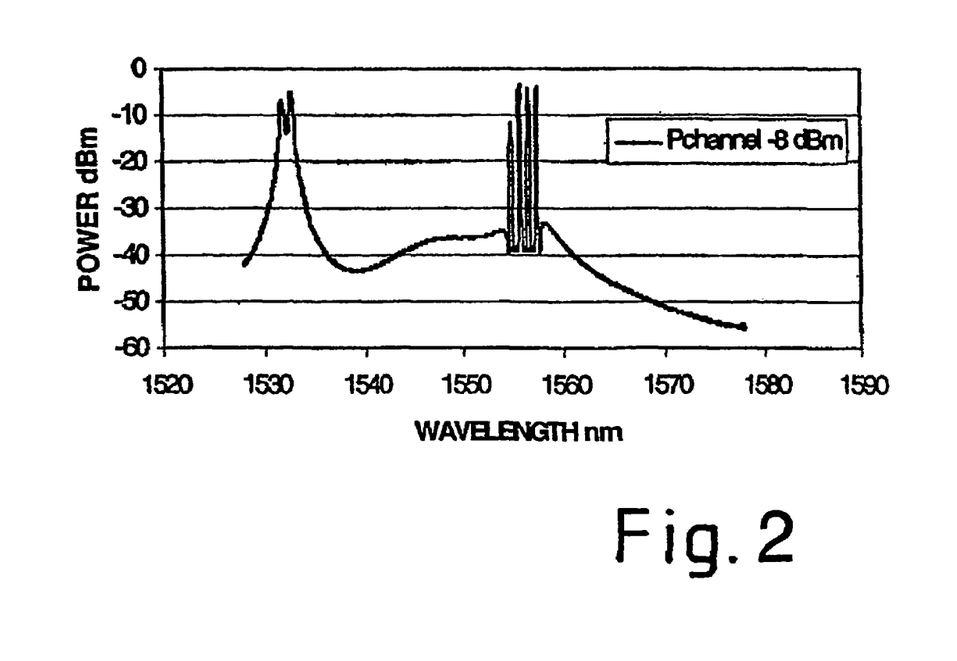
FIGS. 2 and 3 show graphs of the amplifier output spectrum of a prior art network in two different load conditions.
Figure 3:
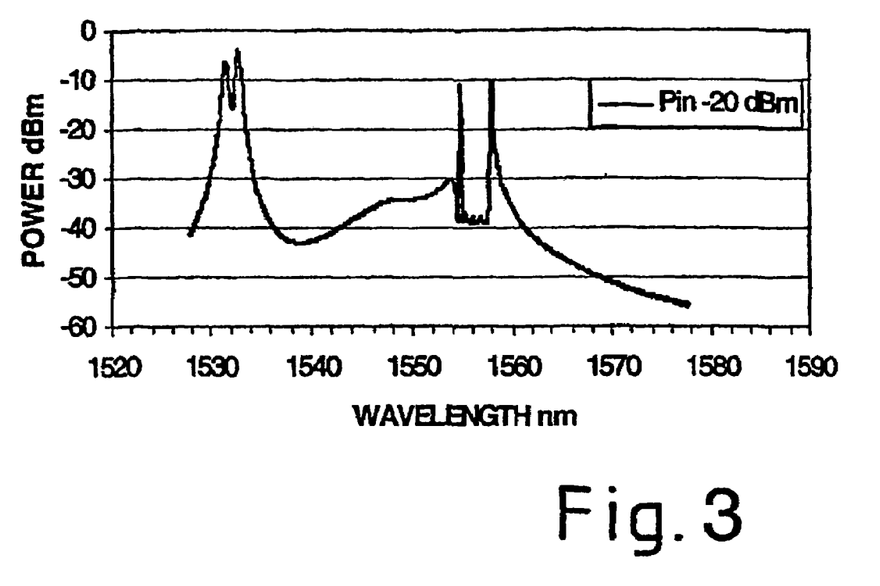

FIGS. 2 and 3 show the output spectra after the last EDFA in the looped network when the control in accordance with the present invention is not used. The section balance (4×19 dB)

is such that the gain peak is between 1532 nm and 1560 nm. FIG. 2 shows full load (all channels) and FIG. 3 shows a single active channel.

It is noted that the associated low loss of the section can be advantageous in terms of OSNR performance (27 dB on a band amplitude resolution of 0.1 nm) but is not at all optimal in terms of dynamic behavior upon ADD and DROP of channels and as gain uniformity.

Figure 4:
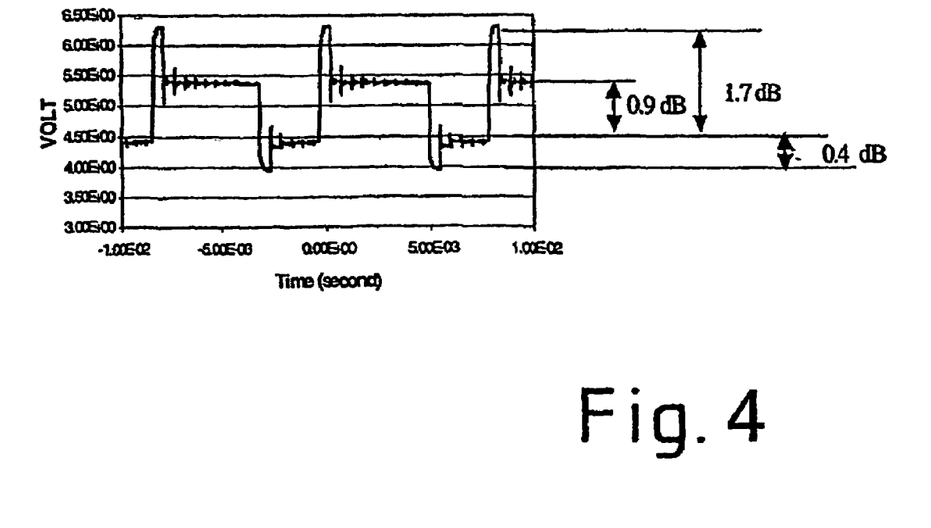
FIG. 4 shows a graph of the behavior at the transient of a generic prior art network.

On this point, in the network without control in accordance with the present invention, FIG. 4 shows the test power range at the output of the last EDFA induced by extinction of the three channels simulating full network load. Note the high transient for a network with control and formation of amplified spontaneous emission peaks in the spectral zone of the WDM signals. Such a looped network is based on ASE recirculation and would require a high section loss (at least 21 dB) to ensure steady operating conditions while avoiding the risk of gain peaks caused by the WDM channels. Satisfying this condition necessarily induces poor performance concerning the OSNR and does not supply acceptable performance with more than six sections. In this specification recirculation means propagation around the loop more than once. It will be appreciated that optical components such as the high pass optical filter 20 may at least partially block a portion of the light circulating or recirculating in the loop. However, the devices 14 for adding and dropping channels only act on these channels and leaves the ASE light free to pass therethrough for recirculation in the loop.

Figure 5:
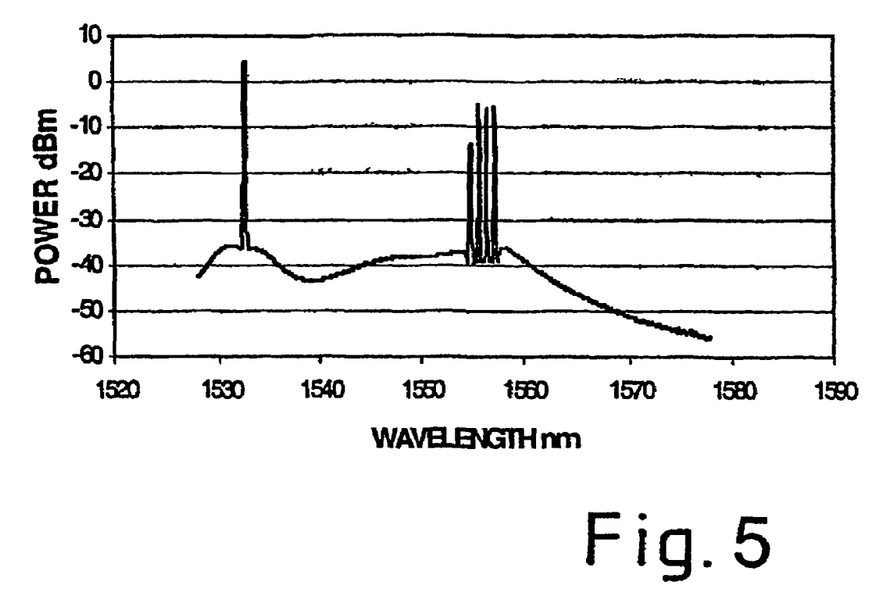
FIGS. 5 and 6 show graphs similar to those of FIGS. 2 and 3 but applying the principles of the present invention.
Figure 6:
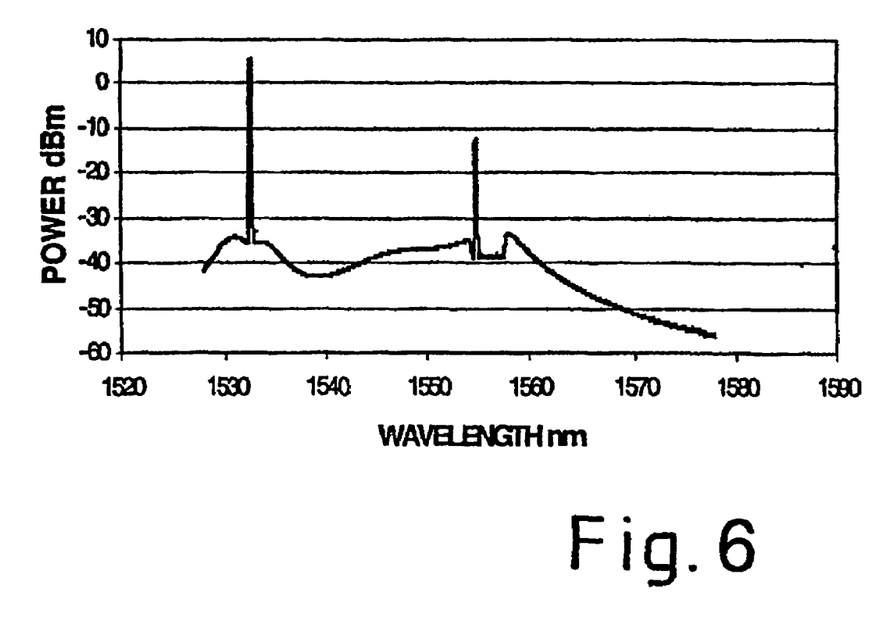

FIGS. 5 and 6 show the output spectrum after the last EDFA in the looped network with link control at 1532 nm and the same section balance (4×19 dB) as in FIGS. 2 and 3. Note the very narrow spectrum of the peak at 1532 nm. It is clear in this case that good OSNR performance can be achieved without the risk of formation of amplified spontaneous emission peaks in the spectral zone of the WDM signals because of the ADD/DROP of WDM channels. If FIGS. 3 and 6 are compared, the nearly total lack of peak at the upper limit of the signal band is also noted. It can also be noted that the presence of the 1532 nm link control avoids formation of a double ASE peak at 1532 nm to supply greater sturdiness of the network in terms of effects dependent upon polarization.

Figure 7:
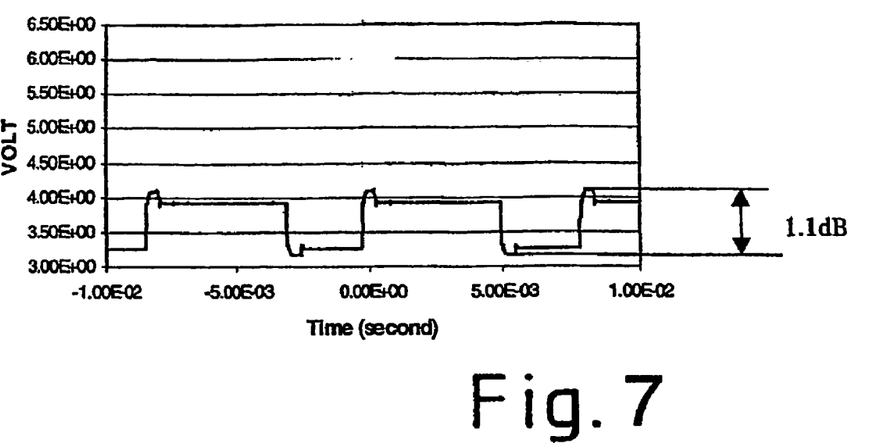
FIG. 7 shows a graph similar to the one of FIG. 4 but applying the principles of the present invention.

FIG. 7 shows the behavior at the transient caused by the ADD/DROP of WDM channels in the network in accordance with the present invention. The loop gain is equal to the loss at the gain peak wavelength so that the lasing action controls the transients. If compared with the result of FIG. 4, ranges of much lower power can be noted, even if induced by the same ADD/DROPs as in FIG. 4.

To further improve performance of the network in accordance with the present invention and also reduce the penalizations introduced by the spectral hole, a high-pass optical filter 20 can be easily introduced in the loop. It was found that the simple addition of such a filter supplies additional improvement in OSNR performance of the entire network.

High-pass optical filters can be used to avoid accumulation of ASEs around 1532 nm and to force the lasing effect at suitable wavelengths by introducing a link control positioned near the WDM signal band above or below the signal wavelength.

The high-pass filter can also be designed to realize equalization in the gain of the WDM signal. In this case each amplifier node of the network can be equipped with such a filter.

Various combinations of filter and link control were found advantageous as follows:
a high-pass optical filter in the looped network to eliminate the accumulation of ASEs below 1535 nm and the link control positioned at a suitable wavelength between the filter cut-off wavelength and the WDM signal band (i.e. advantageously at 1537 nm), a high-pass optical filter in the looped network to eliminate accumulation of ASEs below 1538 nm and link control positioned at a wavelength slightly higher than the WDM signal band (i.e. advantageously at 1564 nm), a high-pass/gain equalizer optical filter in each amplifier network node with one cut-off wavelength around 1535 nm and link control positioned at a suitable wavelength between the filter cut-off wavelength and the WDM signal wavelength (i.e. advantageously at 1537 nm), and a high-pass/gain equalizer optical filter in each network amplifier node with a cut-off wavelength around 1538 nm and link control positioned at a suitable wavelength above the WDM signal wavelength (i.e. advantageously at 1564 nm).

Figure 8:
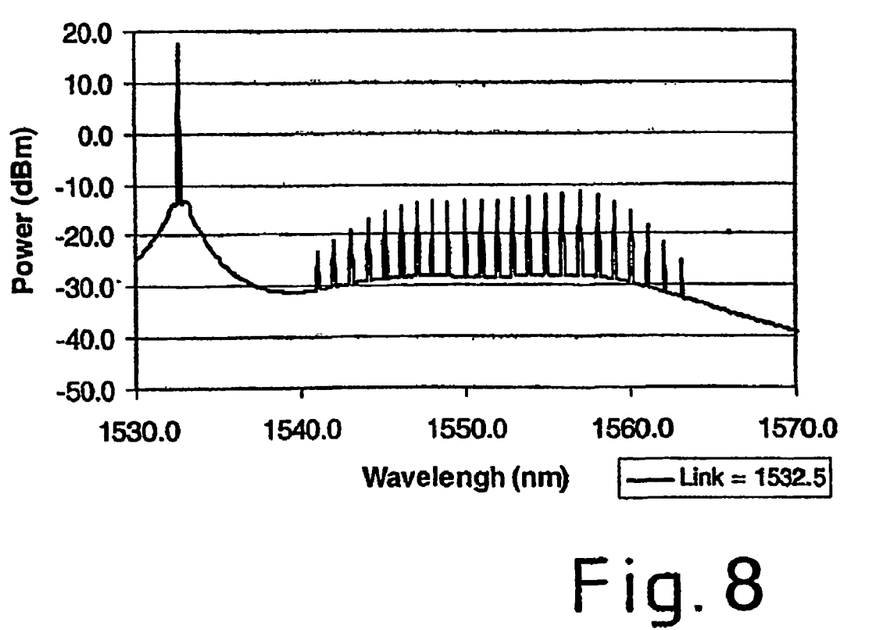
FIGS. 8 through 11 are graphs showing the amplifier output spectrum from a network in accordance with the present invention and with possible variant embodiments of the network.
Figure 9:
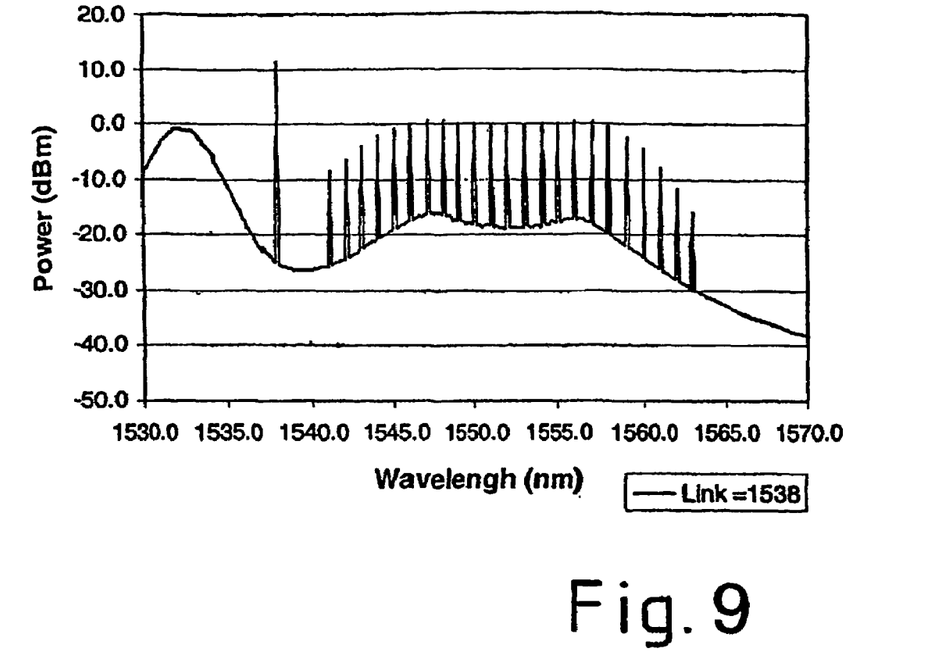
Figure 10:
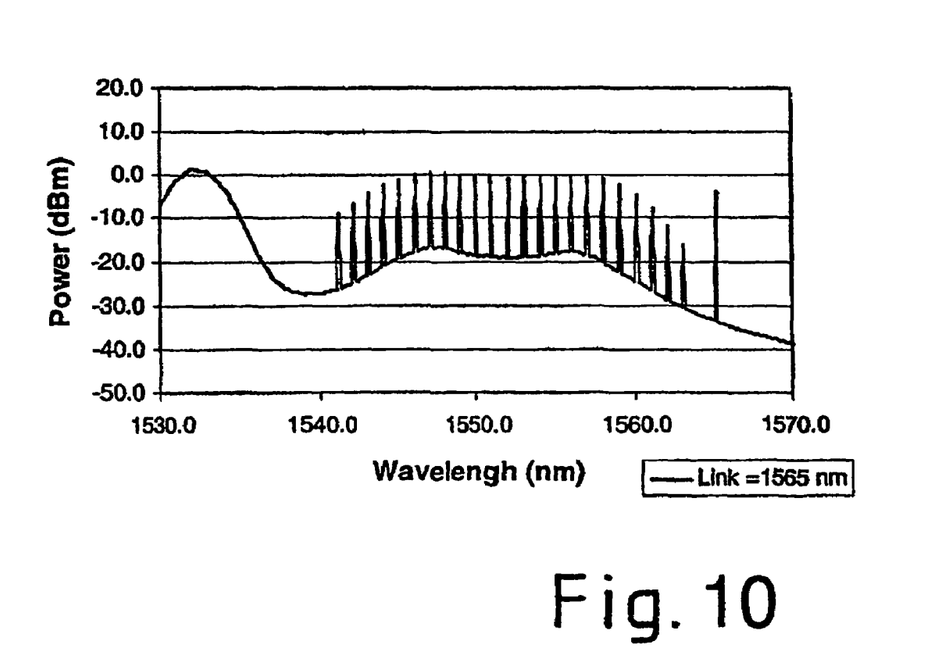

As an example, FIGS. 8, 9 and 10 show OSNR performance for a network in accordance with the present invention characterized by a 8×20 dB section balance and 24 WDM channels spaced at 100 GHz and located between 1542 nm and 1561 nm with and without optical filters.

In particular, FIG. 8 shows the output spectrum in case of a WDM looped network based on ASE recirculation with a link control at 1532 nm and without high-pass filter. FIG. 9 is achieved by introducing a single high-pass optical filter with a cut-off wavelength at 1537 nm and a link control at 1538 nm. Lastly, FIG. 10 refers to the network with a single high-pass optical filter with cut-off wavelength at 1539 nm and link control at 1565 nm.

FIGS. 9 and 10 show clearly an improvement in the OSNR higher by 8 dB for the channels of shorter wavelength proving the effectiveness of using high-pass optical filters in combination with link control techniques in accordance with the present invention to improve the performance of WDM looped networks.

To further show the effectiveness of the link control mechanism combined with a high-pass optical filter to achieve great strength upon the variations of loss in the sections, the results achieved in a network having 8×17 dB section losses can be considered.

Figure 11:
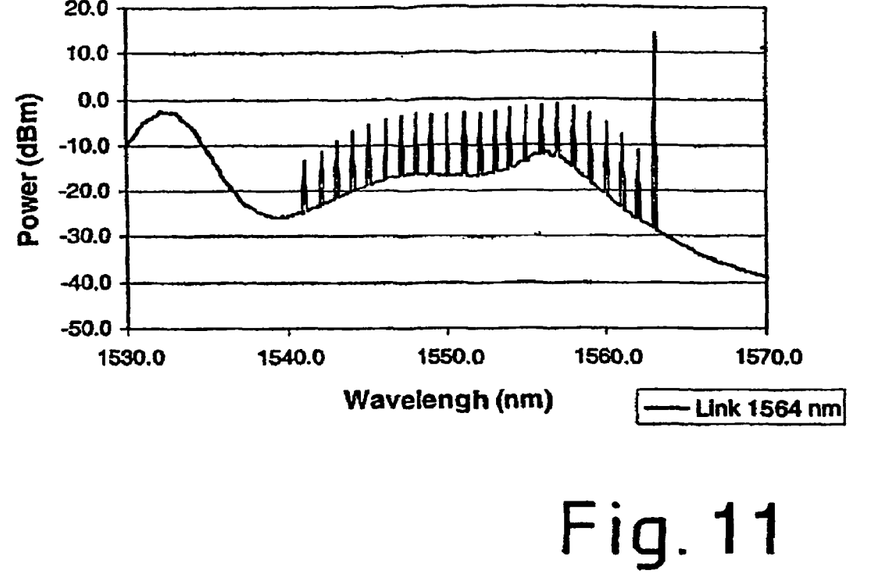
Figure 12:
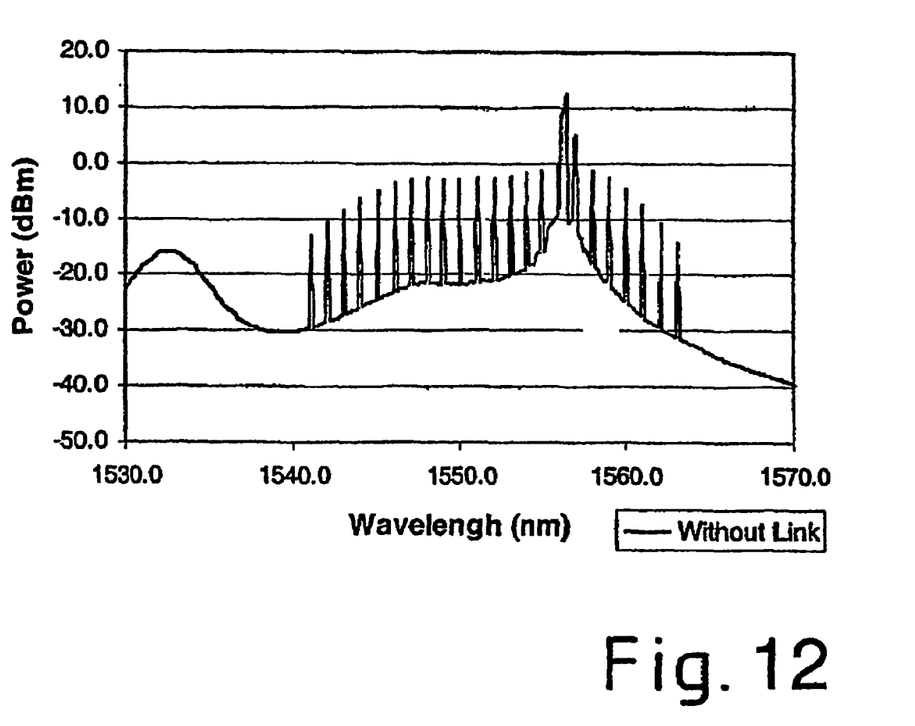
FIG. 12 shows a graph similar to those of FIGS. 8 through 11 but without applying the principles of the present invention.

FIG. 11 shows the output spectrum achieved in such a network with link control at 1565 nm and a single high-pass optical filter with cut-off wavelength at 1539 nm. Comparing this spectrum with the one shown in FIG. 12 and achieved in a network not having link control in accordance with the present invention, it can be seen clearly that the link control at 1565 nm avoids formation of gain peaks below the WDM channel band.

It is noted that the link control at higher signal band wavelength is more effective in supplying strength at the loss variations in the sections in comparison with a link control at lower wavelengths.

Another advantageous effect of the principles of the present invention concerns the network survivability in case of breaks or breakage of EDFA amplifiers or network fibers.

Indeed, the strong power ranges detected in networks not having control in accordance with the present invention can seriously degrade network performance and even damage receiver components especially in a break in an EDFA within the looped network.

Figure 14:
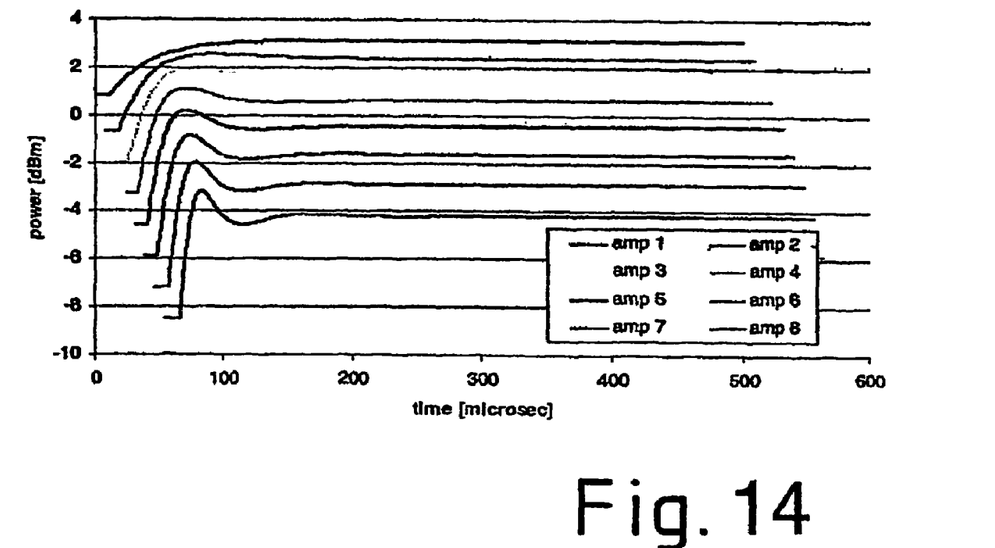
FIGS. 14, 15 and 16 show graphs of transient effects in a network in accordance with the present invention in different failure cases.
Figure 15:
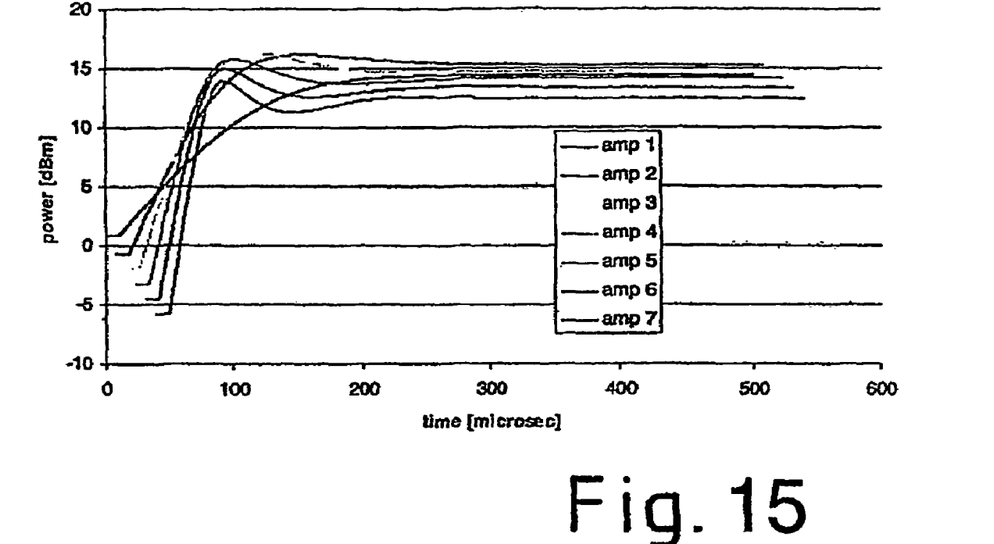

This can be easily observed in FIGS. 14 and 15 where the transients caused on the EDFA outputs because respectively of a fiber break and an EDFA break are shown. Propagation and increase in the effect along the cascaded amplifiers in the loop should be noted.

It is clear that such power ranges which become greater and faster along the EDFA cascade are not acceptable because they can damage the optical components and even induce performance degradation as a result of nonlinear propagation effects. This effect is particularly damaging in case of EDFA breakage since there is no ASE light at the input of the next EDFA along the loop.

In order to take full advantage of the ASE recirculation based WDM looped network in terms of simplicity and cost reduction, it is very important to find suitable solutions capable of improving OSNR performance and at the same time ensure network survivability in case of fiber or EDFA breakage.

Thanks to the innovative principles of a network in accordance with the present invention it is possible to realize with limited additional costs a node amplifier structure ensuring network survival.

Figure 13:
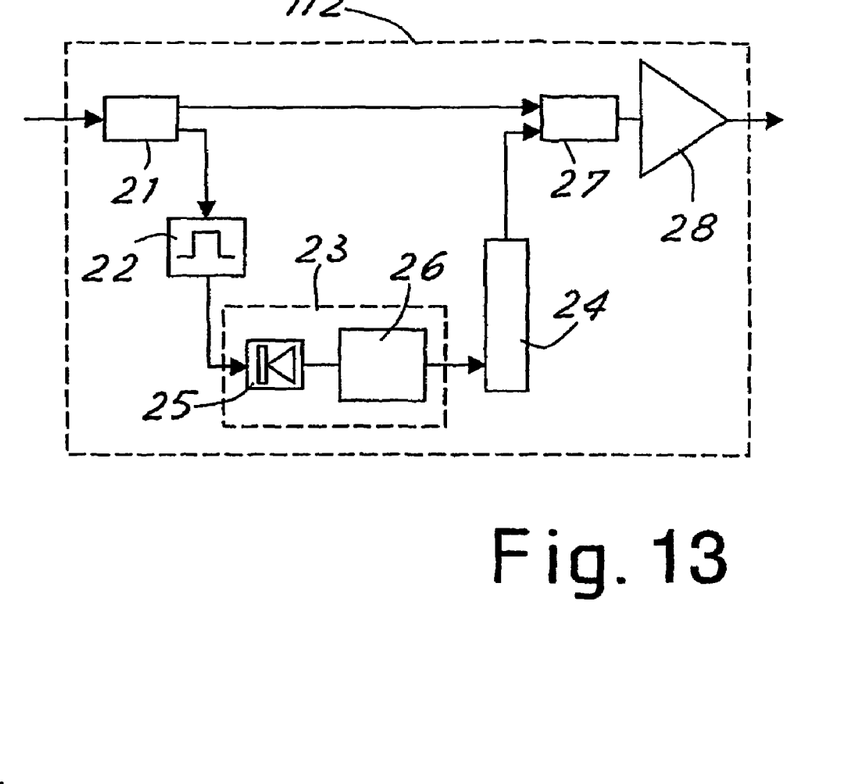
FIG. 13 shows a block diagram of a node of the network realized in accordance with a possible variant applying the principles of the present invention.

To this end, the network nodes which are not "master nodes" are realized in accordance with the diagram of FIG. 13. Basically, each amplifier node (indicated by reference number 112 in FIG. 13) in the looped network, possibly excepting the "master" node, is equipped with a DFB laser 24 (advantageously with a maximum required output power of 10 dBm and emission wavelength around $\lambda_{LINK}$) which can be activated in case of network failure caused by fiber or EDFA breakage.

The device 112 has a detector of any breakage upstream thereof. To realize this detector it was found advantageous to use a simple optical circuit comprising at the EDFA input a 99/1 splitter 21 which takes a fraction of the optical power circulating in the loop and sends it to a band-pass filter 22 centered around $\lambda_{LINK}$ and with a band at −3 dB of a few nm. The filtered signal is sent to a known threshold detector 23 (for example with input photodiode 25 and suitable comparison electronics 26 of the signal obtained) to detect the presence of lasing light within the loop at the filter wavelength. The detector 23 activates the laser 24 if the lasing light power detected falls below the threshold (determined to be a symptom of breakage along the loop upstream). A 90/10 splitter 27 will convey the laser beam together with the input signals to the amplifier 28.

It is noted that only the first amplifier node 112 following a fiber or EDFA break will activate the corresponding DFB laser 24 while all the other nodes will remain unchanged.

After restoration of normal network operating conditions the DFB laser 24 will shut off automatically under control of the detector 26.

Naturally the node 112 can also comprise a known unit of ADD/DROP channels (not shown) similarly to the nodes 12 of FIG. 1.

Figure 16:
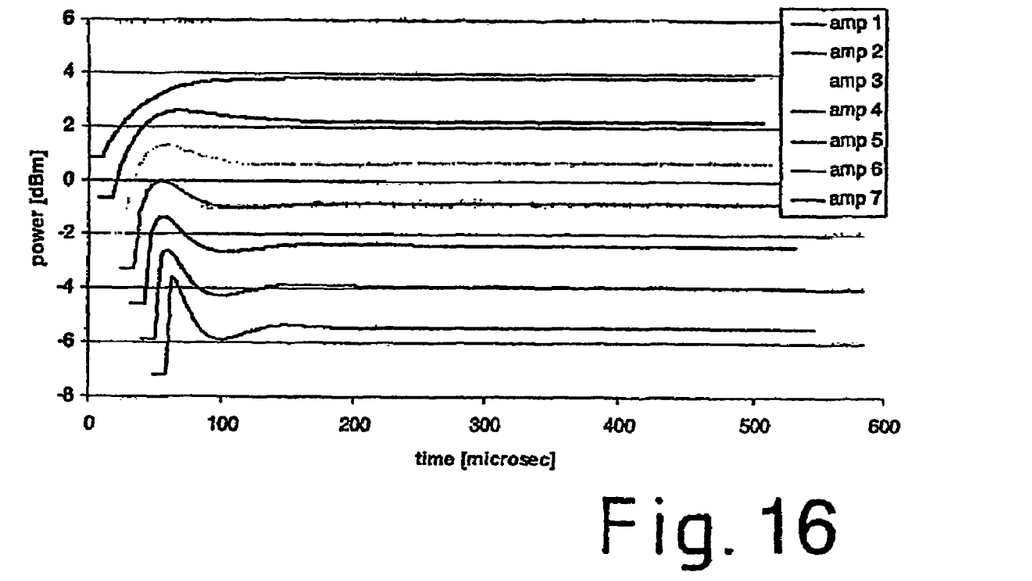

FIG. 16 shows the behavior of the test channel transient induced be a break in an EDFA in a network realized in accordance with the present invention with the amplification nodes 112. It should be noted that the DFB laser 24 at 1532 nm for network survival is activated at −10 dBm on the EDFA input following the break with a delay of 5 microseconds caused by the response time of the electronic circuit realizing the threshold detector 23. From FIG. 16 it is clear that activation of the DFB laser 24 at the first node following the EDFA break effectively prevents broad signal power ranges observed without a control mechanism in accordance with the present invention. It is now clear that the predetermined purposes have been achieved by making available a link control mechanism supplying network sturdiness in terms of section loss variations and improving the OSNR of the WDM signal under normal operating conditions. In addition, the link control mechanism can also be combined with the use of high-pass optical filters to further improve network OSNR performance and can also be used to ensure network survival in case of breakage of fibers or EDFA.

Whilst the described looped optical network is configured to operate on the C-Band between 1530-1565 nm it will be appreciated that the invention could be adapted for use with other bands such as the L-Band between 1565-1625 nm.

Naturally the above description of an embodiment applying the innovative principles of the present invention is given by way of non-limiting example of said principles within the scope of the exclusive right claimed here. For example, the network can have any extension and complexity and comprise additional known members for the specific application.

The invention claimed is:

1. A looped Wavelength Division Multiplexing (WDM) optical network comprising:
    a plurality of nodes connected with a plurality of waveguides to form an optical loop, the optical loop including:
        optical amplifiers between sections of the loop;
        Amplified Spontaneous Emission (ASE) recirculation in the loop which is used for gain control; and
        a link control laser configured to inject laser radiation centered around a $\lambda_{LINK}$ wavelength into the loop at a point of the loop where it is desired that a lasing peak be generated and allowed to circulate in the loop to control lasing generated by the ASE recirculation.

2. The optical network of claim 1 wherein the laser radiation injection point is contained in a network amplification node.

3. The optical network of claim 2 wherein the laser radiation injection point is upstream of an Eribium-Doped Fiber Amplifier (EDFA) amplifier contained in said network amplification node.

4. The optical network of claim 1 wherein the $\lambda_{LINK}$ wavelength is below a band of channels transmitted in the network.

5. The optical network of claim 4 wherein the $\lambda_{LINK}$ wavelength is centered around 1530 nm or 1538 nm.

6. The optical network of claim 1 wherein the $\lambda_{LINK}$ wavelength is above a band of signal channels transmitted in the network.

7. The optical network of claim 6 wherein the $\lambda_{LINK}$ wavelength is centered around 1564 nm.

8. The optical network of claim 1 further comprising at least one high-pass optical filter along the loop, the at least one high-pass optical filter having a cut-off wavelength that is above the wavelength of an ASE peak of the network, but below the $\lambda_{LINK}$ wavelength and a network channel signal band.

9. The optical network of claim 8 wherein the cut-off wavelength eliminates the accumulation of ASE below 1535 nm and wherein the $\lambda_{LINK}$ wavelength is between the cut-off wavelength and a WDM signal band.

10. The optical network of claim 8 wherein the cut-off wavelength eliminates the accumulation of ASE below 1538 nm, and wherein the $\lambda_{LINK}$ wavelength is slightly higher than a WDM signal band.

11. The optical network of claim 8 wherein the high-pass optical filter is present in a plurality of network amplifier nodes.

12. The optical network of claim 1 further comprising a redundant laser generation system having a plurality of lasers to produce the laser radiation.

13. The optical network of claim 12 wherein the redundant laser system comprises two lasers which are adapted to be selectively and alternatively activated.

14. The optical network of claim 1 further comprising:
a plurality of amplification nodes distributed along the loop, each amplification node comprising a laser source to input laser radiation with an emission wavelength around $\lambda_{LINK}$ into the loop; and
each amplification node comprising a laser source control circuitry to detect the lasing light input power at the node, and to activate the laser source upon decay of said power to below a predetermined threshold.

15. The optical network of claim 14 wherein the laser source has an output power of at least approximately 10 dBm.

16. The optical network of claim 15 wherein the laser source control circuitry comprises:
a first splitter to send a fraction of the optical power input to a band-pass filter centered around $\lambda_{LINK}$ and with a band at −3 dB on the order of a few nm output from the band-pass filter;
a threshold detector to receive a filtered signal from the band-pass filter, and to activate the laser source upon decay of the filtered signal to below said predetermined threshold; and
a second splitter to convey the laser radiation produced by the laser source together with signals input to an amplifier of the amplification node.

17. The optical network of claim 1 wherein the laser radiation is at a power selected to be between about −5 dBm and +10 dBm.

18. A method of link control in a looped WDM optical network comprising:
forming an optical loop to include optical amplifiers between loop sections and ASE recirculation in the loop; and
injecting link control laser radiation centered around a $\lambda_{LINK}$ wavelength into the optical loop a point where a desired lasing peak is to be generated and made to circulate through the optical loop to control lasing generated by the ASE recirculation.

19. The method of claim 18 further comprising filtering the laser radiation circulating through the optical loop with a high-pass filter having a cut-off wavelength that is higher than the wavelength of an ASE peak in the network, but lower than the $\lambda_{LINK}$ wavelength and a signal channel band in the network.

20. The method of claim 18 wherein the laser radiation power is selected to be between about −5 dBm and +10 dBm.

* * * * *

UNITED STATES PATENT AND TRADEMARK OFFICE
CERTIFICATE OF CORRECTION

PATENT NO. : 7,417,790 B2
APPLICATION NO. : 10/571506
DATED : August 26, 2008
INVENTOR(S) : Bogoni et al.

It is certified that error appears in the above-identified patent and that said Letters Patent is hereby corrected as shown below:

On the Title Page Item (75), under "Inventors", Line 2, delete "Milan" and insert -- Milano --, therefor.

On the Title Page Item (56), under "OTHER PUBLICATIONS", Line 1, delete "Lashing" and insert -- Lasing --, therefor.

Signed and Sealed this

Thirty-first Day of March, 2009

JOHN DOLL
*Acting Director of the United States Patent and Trademark Office*